Aug. 13, 1974     R. G. SHEALY     3,829,300

BUSHING UNIT INCLUDING CAST IRON BUSHING FRAME

Original Filed Jan. 1, 1972

3,829,300

BUSHING UNIT INCLUDING CAST IRON BUSHING FRAME

Robert G. Shealy, Shelby, N.C., assignor to PPG Industries, Inc., Pittsburgh, Pa.

Continuation of application Ser. No. 216,473, Jan. 10, 1972, which is a continuation-in-part of application Ser. No. 106,928, Jan. 15, 1971, which in turn is a continuation of application Ser. No. 771,078, Oct. 28, 1968, all now abandoned. This application Sept. 14, 1973, Ser. No. 397,464

Int. Cl. C03b 37/02
U.S. Cl. 65—1  3 Claims

ABSTRACT OF THE DISCLOSURE

A bushing frame for supporting a fiber glass forming bushing is constructed of cast iron. Cast iron of the white or gray type may be employed. Preferably ductile cast iron or ferritic nodular cast iron is employed.

CROSS-REFERENCE TO RELATED APPLICATIONS

Figure 1:
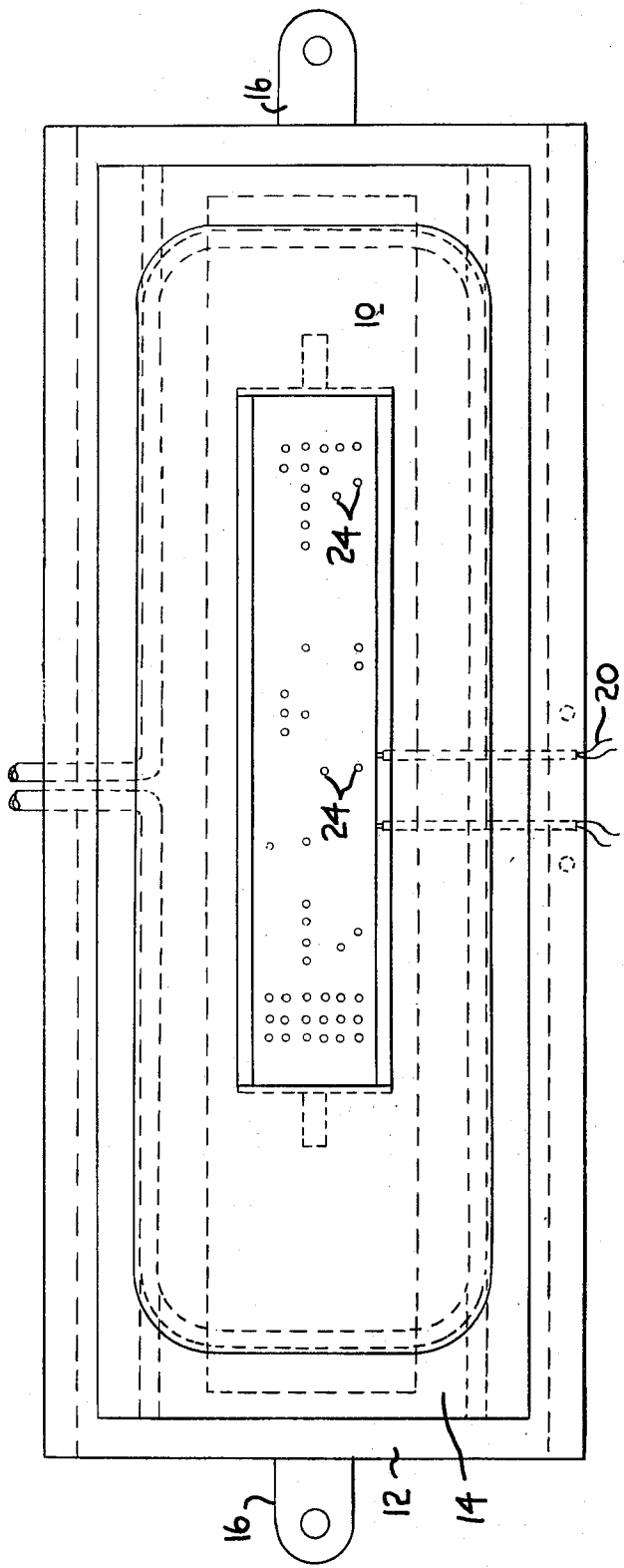

This application is a continuation of application Ser. No. 216,473, filed Jan. 10, 1972, which is a continuation-in-part of application Ser. No. 106,928, filed Jan. 15, 1971, which is a continuation of application Ser. No. 771,078, filed Oct. 28, 1968, all now abandoned.

BACKGROUND OF THE INVENTION

Glass fibers are generally produced by flowing streams of molten glass through orifices in an electrically heated bushing made of platinum or a platinum alloy. The bushing is rigidly supported in a bushing frame. Heretofore, the bushing frame has been made of bronze manganese, a nonmagnetic material. Experience has shown that some of the difficulties encountered in the manufacture of glass fibers has been caused by sagging bushing frames. This sagging is believed due to the high heat which the bushing frames are exposed to in glass fiber manufacture. Typically, bushing frames are exposed to relatively high temperatures, on the order of 400° F. to 850° F. during glass forming. Sagging bushing frames cause distortion of the supported bushing and materially shorten the useful life of a bushing in that the spacing of the terminal ends of the orifice tips is changed. This alternation of the orifice tips of a bushing introduces additional considerations in the process. Thus, misalignment of the tips effects the productivity of a bushing usually resulting in loss of production. To correct this, extensive and repeated reworking of the bronze manganese is required to eliminate the sags therein. Repeated reworking of these frames is often not feasible because the metal becomes deformed to a condition such that it is no longer usable.

THE INVENTION

According to this invention, the bushing frames used to support a fiber glass bushing are made of cast iron. This materially reduces the cost of the frames and the cast iron is found to be highly resistant to the elevated temperatures encountered at the bushing. While white or gray cast iron may be used since it has good resistance to heat and little or no distortion will be encountered during operation, ductile or ferritic nodular cast iron in which the graphitic constituent is in spherical or nodular form is preferred for use as a bushing frame.

Gray cast iron typically found in the art contains from 1.7 to 4.5 carbon and from 1 to 3 percent silicon. The excess carbon is in the form of flakes which imparts to the material the dark colored fracture which gives it its name.

White cast iron typically found in the art contains all of the carbon present in the combined or cementite form. It is named because it has a silvery-white fracture. The iron is typified by its lack of ductility and is consequently brittle. They possess high compressive strength but are less resistant to impact loading than gray cast irons.

Ductile cast irons or ferritic nodular iron as found in the art are characterized by having the graphite present in ball-like form instead of the flakes found in gray cast iron. The presence of small amounts of magnesium or cerium-bearing alloys and special processing produces this spherical graphite and results in castings that are high in strength and which have appreciable ductility.

Since the white or gray cast irons of the instant invention in which the graphitic constituent is in flake form are relatively brittle, if any sagging of the frame occurs, the frame cannot be reworked.

The preferred ductile cast iron of the instant invention in addition to showing excellent properties in operation as a bushing support material can be reworked if necessary or desirable due to its ductility.

In accordance with this invention extensive tests have shown that ductile cast iron bushing frames used under the same conditions as the bronze manganese frames of the prior art during fiber glass forming from a bushing supported by them do not sag at all. It has also been found that bushing life using ductile cast iron frames has more than doubled when compared to bushing life with the bronze manganese frames. Combining these properties with the initial cost of ductile cast iron frames as compared with the conventional bronze manganese frames, i.e., on the order of one-half indicates the value of this invention.

Conventional bronze manganese frames are made of a non-magnetic alloy. While it was thought initially that cast iron frames, because they were constructed of a magnetic material, would be magnetically heated because of the high electric current conditions at the bushing (it must be remembered bushings are electrically heated), in actual operation it has been found that no adverse problems have occurred in this respect.

THE DRAWING

Figure 2:
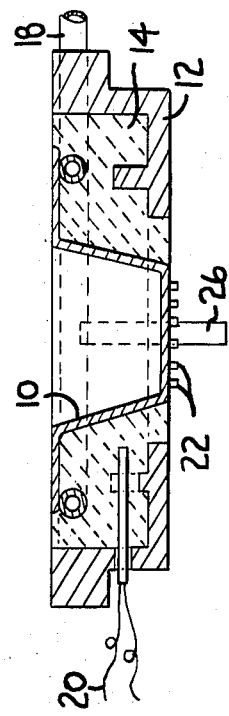

FIG. 1 is a plan view of a bushing unit which includes a ductile iron bushing frame; and FIG. 2 is a sectional view taken along line 2—2 of FIG. 1.

THE PREFERRED EMBODIMENT

The drawings illustrate a bushing unit which includes a platinum or plantium alloy bushing 10, a bushing frame or support 12, which according to this invention is constructed of ductile cast iron or ferritic nodular cast iron with refractory insulation 14 positioned between the bushing and the frame. The refractory 14 may be cast in situ as disclosed and claimed in U.S. Pat. No. 3,164,458 or assembled in small blocks, as desired. The frame 12 is provided with lugs 16 for attachment to a fiber glass forehearth (not shown) in line with an opening therein. When a bushing becomes worn or damaged or a product change (diameter of fiber) is required, the entire frame assembly is removed and replaced.

The bushing frame as cast is provided with portions to receive cooling tubes 18 and thermocouple wires 20 as is the conventional practice in the art. Parts of the frame are machined to provide finished surfaces, as desired. The bushing 10 is provided with a plurality of tips 22 having orifices 24 therethrough for the passage of streams of molten glass fed to the bushing. Bus bars 26 connected to the ends of the bushing 10 are connected to a source of electrical energy, such that the bushing 10 is heated to fiber forming temperatures by the current passing therethrough and the glass therein is heated and maintained in molten state by conduction of the heat of the bushing.

The fibers are drawn, grouped together and collected as in the normal process.

As previously stated, the casting which forms the bushing frame is of cast iron, preferably ductile cast iron or ferritic cast iron, i.e., iron in which the graphitic constituent is spherical or nodular in form. Gray or white cast iron may also be used as described hereinabove. In the event that warpage of the frame occurs using the white or gray cast iron however, it must be remembered that it cannot be reworked.

In practice using the preferred ductile iron of the example it has been found that sagging of the frame has been virtually eliminated so that time and expense in reworking bushing frames has been essentially eliminated.

While the invention has been described with reference to certain specific embodiments, it is not intended to be limited thereby except insofar as appears in the accompanying claims.

I claim:

1. A bushing unit for producing glass fibers comprising a bushing, a mass of refractory insulation positioned around the sides and ends of the bushing, the bottom of the bushing being provided with a plurality of orifices through which glass fibers are drawn, a bushing frame constructed of cast iron mounted underneath said insulation and around the periphery thereof but out of contact with the bushing thereby providing elecrical insulation between the frame and the bushing and means to electrically heat said bushing.

2. A bushing unit as recited in Claim 1 in which said frame is constructed of ferritic nodular cast iron.

3. A bushing frame as in Claim 1 of ductile cast iron.

References Cited

UNITED STATES PATENTS

| 3,424,569 | 1/1969 | Huebner | 65—374 X |
| 2,794,058 | 5/1957 | Russell | 65—1 |
| 3,600,159 | 8/1971 | Moore et al. | 75—123 CB |

ROBERT L. LINDSAY, Jr., Primary Examiner

U.S. Cl. X.R.

65—374